(12) United States Patent
Wang et al.

(10) Patent No.: US 9,966,874 B2
(45) Date of Patent: May 8, 2018

(54) POWER-CELL SWITCHING-CYCLE CAPACITOR VOLTAGE CONTROL FOR MODULAR MULTI-LEVEL CONVERTERS

(71) Applicant: Virginia Tech Intellectual Properties, Inc., Blacksburg, VA (US)

(72) Inventors: Jun Wang, Blacksburg, VA (US); Rolando Burgos, Blacksburg, VA (US); Dushan Boroyevich, Blackburg, VA (US); Bo Wen, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 713 days.

(21) Appl. No.: 14/578,651

(22) Filed: Dec. 22, 2014

(65) Prior Publication Data

US 2015/0207434 A1 Jul. 23, 2015

Related U.S. Application Data

(60) Provisional application No. 62/027,551, filed on Jul. 22, 2014, provisional application No. 61/927,514, filed on Jan. 15, 2014.

(51) Int. Cl.
*H02M 7/483* (2007.01)
*H02M 1/00* (2006.01)

(52) U.S. Cl.
CPC .... *H02M 7/483* (2013.01); *H02M 2001/0003* (2013.01); *H02M 2007/4835* (2013.01)

(58) Field of Classification Search
CPC .......... H02M 7/02; H02M 7/06; H02M 7/155; H02M 7/42; H02M 2007/4835;

(Continued)

(56) References Cited

U.S. PATENT DOCUMENTS

| 2013/0234681 A1* | 9/2013 | Aiello | G05F 3/08 |
| | | | 323/208 |
| 2014/0002048 A1* | 1/2014 | Pang | H02M 11/00 |
| | | | 323/304 |

(Continued)

FOREIGN PATENT DOCUMENTS

EP 2725700 * 4/2017

OTHER PUBLICATIONS

Yushu Zhang, G. P. Adam, T.C. Lim, Stephen J. Finney, B. W. Williams; "Analysis and Experiment Validation of a Three-Level Modular Multilevel Converters"; Jul. 7, 2017; IEEE; pp. 983-990.*

(Continued)

*Primary Examiner* — Emily P Pham
*Assistant Examiner* — Shahzeb K Ahmad
(74) *Attorney, Agent, or Firm* — Whitham, Curtis & Cook, P.C.

(57) ABSTRACT

In a modular multi-level power converter, additional switching states are interleaved between main switching states that control output voltage or waveform. The additional switching states provide current from a DC-link to charge capacitors in respective modules or cells to an offset voltage from which the capacitor voltages are controlled toward a reference voltage during each switching cycle rather than being allowed to build up over a period of an output waveform of variable line frequency, possibly including zero frequency. Since the switching cycle is much shorter than the duration of a line frequency cycle and the capacitor voltages are balanced during each switching cycle, output voltage ripple can be limited as desired with a capacitor of much smaller value and size than would otherwise be required.

20 Claims, 15 Drawing Sheets

(58) Field of Classification Search
CPC . H02M 2001/0003; H02M 2001/0032; H02M 2001/123; H02M 7/483; H02M 7/487
See application file for complete search history.

(56) References Cited

U.S. PATENT DOCUMENTS

2015/0124506 A1* 5/2015 Sahoo .................. H02M 5/225
 363/126
2015/0171726 A1* 6/2015 Singh Riar ........... H02M 7/487
 363/65
2016/0308458 A1* 10/2016 Jimichi ................. H02M 1/32

OTHER PUBLICATIONS

Jiangchao Qin; "Predictive Control of a Modular Multilevel Converter for a Back-to-Back HVDC System"; Nov. 25, 2013; IEEE; pp. 1538-1547.*

* cited by examiner $$i_U = \left\{ \frac{\omega_0 V_S \cos(2\pi \cdot k/CR)}{(\omega_{r1}^2 - \omega_0^2)(2L_O + L)} \left[ \frac{1}{2} + \frac{(C_L - C_U)}{2(\omega_{r1}^2 - \omega_{r2}^2)C_U C_L L_1} + \frac{1}{(\omega_{r1}^2 - \omega_{r2}^2)C_L L_2} \right] + \frac{I_{U0}}{2} + \frac{(C_L - C_U)I_{U0}}{2(\omega_{r1}^2 - \omega_{r2}^2)C_U C_L L_1} + \frac{I_{U0}}{(\omega_{r1}^2 - \omega_{r2}^2)C_L L_2} \right\} \cdot \cos(\omega_{r1} t)$$

$$- \left\{ \frac{0.5 V_{dc}}{\omega_{r1} I} \left[ \frac{1}{2} + \frac{(C_L - C_U)}{2(\omega_{r1}^2 - \omega_{r2}^2)C_U C_L L_1} + \frac{1}{(\omega_{r1}^2 - \omega_{r2}^2)C_L L_2} \right] - \frac{\omega_{r1} V_S \sin(2\pi \cdot k/CR)}{(\omega_{r1}^2 - \omega_0^2)(2L_O + L)} \left[ \frac{1}{2} + \frac{(C_L - C_U)}{2(\omega_{r1}^2 - \omega_{r2}^2)C_U C_L L_1} + \frac{1}{(\omega_{r1}^2 - \omega_{r2}^2)C_L L_2} \right] + \frac{\omega_{r1} C_U V_{U0}}{(\omega_{r1}^2 - \omega_{r2}^2)C_L L_1} + \frac{\omega_{r1} V_{U0}}{(\omega_{r1}^2 - \omega_{r2}^2)L_2} - \frac{\omega_{r1}^3 C_U V_{U0}}{(\omega_{r1}^2 - \omega_{r2}^2)} \right\} \cdot \sin(\omega_{r1} t)$$

$$+ \left\{ \frac{\omega_0 V_S \cos(2\pi \cdot k/CR)}{(\omega_{r2}^2 - \omega_0^2)(2L_O + L)} \left[ \frac{1}{2} - \frac{(C_L - C_U)}{2(\omega_{r1}^2 - \omega_{r2}^2)C_U C_L L_1} - \frac{1}{(\omega_{r1}^2 - \omega_{r2}^2)C_L L_2} \right] + \frac{I_{U0}}{2} - \frac{(C_L - C_U)I_{U0}}{2(\omega_{r1}^2 - \omega_{r2}^2)C_U C_L L_1} - \frac{I_{U0}}{(\omega_{r1}^2 - \omega_{r2}^2)C_L L_2} \right\} \cdot \cos(\omega_{r2} t)$$

$$- \left\{ \frac{0.5 V_{dc}}{\omega_{r2} I} \left[ \frac{1}{2} - \frac{(C_L - C_U)}{2(\omega_{r1}^2 - \omega_{r2}^2)C_U C_L L_1} - \frac{1}{(\omega_{r1}^2 - \omega_{r2}^2)C_L L_2} \right] - \frac{\omega_{r2} V_S \sin(2\pi \cdot k/CR)}{(\omega_{r2}^2 - \omega_0^2)(2L_O + L)} \left[ \frac{1}{2} - \frac{(C_L - C_U)}{2(\omega_{r1}^2 - \omega_{r2}^2)C_U C_L L_1} - \frac{1}{(\omega_{r1}^2 - \omega_{r2}^2)C_L L_2} \right] + \frac{\omega_{r2} C_U V_{U0}}{(\omega_{r1}^2 - \omega_{r2}^2)C_L L_1} + \frac{\omega_{r2} V_{U0}}{(\omega_{r1}^2 - \omega_{r2}^2)L_2} - \frac{\omega_{r2}^3 C_U V_{U0}}{(\omega_{r1}^2 - \omega_{r2}^2)} \right\} \cdot \sin(\omega_{r2} t)$$

$$- \left\{ \left[ \frac{1}{\omega_{r1}^2 - \omega_0^2} + \frac{1}{\omega_{r2}^2 - \omega_0^2} \right] \left[ -\frac{1}{2} + \frac{(C_L - C_U)}{2(\omega_{r1}^2 - \omega_{r2}^2)C_U C_L L_1} + \frac{1}{(\omega_{r1}^2 - \omega_{r2}^2)C_L L_2} \right] \right\} \cdot \cos(\omega_0 t + 2\pi \cdot k/CR)$$

$$+ \frac{\omega_0 V_S}{(2L_O + L)} \quad (17)$$

*Figure 6B*

$$i_L = \left\{ \frac{\omega_0 V_S \cos(2\pi \cdot k/CR)}{(\omega_{r1}^2 - \omega_0^2)(2L_O + L)} \left[ -\frac{1}{2} + \frac{(C_U - C_L)}{2(\omega_{r1}^2 - \omega_{r2}^2)C_U C_L L_1} + \frac{1}{(\omega_{r1}^2 - \omega_{r2}^2)C_U L_2} \right] \right. \\
+ \frac{I_{L0}}{2} + \frac{(C_U - C_L)I_{L0}}{2(\omega_{r1}^2 - \omega_{r2}^2)C_U C_L L_1} + \frac{I_{U0}}{(\omega_{r1}^2 - \omega_{r2}^2)C_U L_2} \\
- \frac{0.5 V_{dc}}{\omega_{r1} I_L} - \frac{(C_U - C_L)}{2(\omega_{r1}^2 - \omega_{r2}^2)C_U C_L L_1} - \frac{1}{(\omega_{r1}^2 - \omega_{r2}^2)C_U L_2} \\
- \frac{\omega_{r1} V_S \sin(2\pi \cdot k/CR)}{(\omega_{r1}^2 - \omega_0^2)(2L_O + L)} \left[ \frac{1}{2} + \frac{(C_U - C_L)}{2(\omega_{r1}^2 - \omega_{r2}^2)C_U C_L L_1} + \frac{1}{(\omega_{r1}^2 - \omega_{r2}^2)C_U L_2} \right] \frac{V_{L0}}{2} \\
+ \frac{\omega_{r1} C_L V_{L0}}{2} + \frac{\omega_{r1}(C_L - C_U)V_{L0}}{2(\omega_{r1}^2 - \omega_{r2}^2)L_2} \right\} \cdot \cos(\omega_{r1} t) \\
+ \left\{ \frac{\omega_0 V_S \cos(2\pi \cdot k/CR)}{(\omega_{r2}^2 - \omega_0^2)(2L_O + L)} \left[ -\frac{1}{2} - \frac{(C_U - C_L)}{2(\omega_{r1}^2 - \omega_{r2}^2)C_U C_L L_1} - \frac{1}{(\omega_{r1}^2 - \omega_{r2}^2)C_U L_2} \right] \right. \\
+ \frac{I_{L0}}{2} - \frac{(C_U - C_L)I_{L0}}{2(\omega_{r1}^2 - \omega_{r2}^2)C_U C_L L_1} - \frac{I_{U0}}{(\omega_{r1}^2 - \omega_{r2}^2)C_U L_2} \\
- \frac{0.5 V_{dc}}{\omega_{r2} I_L} \left[ \frac{1}{2} - \frac{(C_U - C_L)}{2(\omega_{r1}^2 - \omega_{r2}^2)C_U C_L L_1} - \frac{1}{(\omega_{r1}^2 - \omega_{r2}^2)C_U L_2} \right] \\
- \frac{\omega_{r2} V_S \sin(2\pi \cdot k/CR)}{(\omega_{r1}^2 - \omega_{r2}^2)(2L_O + L)} \left[ \frac{1}{2} - \frac{(C_U - C_L)}{2(\omega_{r1}^2 - \omega_{r2}^2)C_U C_L L_1} - \frac{1}{(\omega_{r1}^2 - \omega_{r2}^2)C_U L_2} \right] \\
+ \frac{\omega_{r2} V_{U0}}{(\omega_{r1}^2 - \omega_{r2}^2)L_2} + \frac{\omega_{r2} C_L V_{L0}}{2} + \frac{\omega_{r2}(C_L - C_U)V_{L0}}{2(\omega_{r1}^2 - \omega_{r2}^2)C_U L_2} \right\} \cdot \sin(\omega_{r2} t) \\
+ \left\{ \left[ \frac{1}{\omega_{r1}^2 - \omega_0^2} \right] \left[ \frac{1}{2} + \frac{(C_U - C_L)}{2(\omega_{r1}^2 - \omega_{r2}^2)C_U C_L I_L} - \frac{1}{(\omega_{r1}^2 - \omega_{r2}^2)C_U I_2} \right] \right. \\
+ \left[ \frac{1}{\omega_{r2}^2 - \omega_0^2} \right] \left[ \frac{1}{2} - \frac{(C_U - C_L)}{2(\omega_{r1}^2 - \omega_{r2}^2)C_U C_L I_L} + \frac{1}{(\omega_{r1}^2 - \omega_{r2}^2)C_U L_2} \right] \\
+ \frac{\omega_0 V_S}{(2L_O + L)} \right\} \cdot \cos(\omega_0 t + 2\pi \cdot k/CR) \quad (18)$$

*Figure 6C*

POWER-CELL SWITCHING-CYCLE CAPACITOR VOLTAGE CONTROL FOR MODULAR MULTI-LEVEL CONVERTERS

CROSS-REFERENCE TO RELATED APPLICATIONS

This application claims benefit of priority of U.S. Provisional Applications 61/927,514, filed Jan. 15, 2014 and 62/027,551, filed Jul. 22, 2014, both of which are hereby incorporated by reference in their entireties.

FIELD OF THE INVENTION

The present invention generally relates to modular power converters, including modular multi-level converters (MMCs) and, more particularly, a switching-cycle capacitor voltage control (SCCVC) therefor to reduce required capacitor size and value and increase power density.

BACKGROUND OF THE INVENTION

Although most electronic devices operate from power supplied at a more-or-less constant voltage (referred to as direct current or DC), many devices presenting larger loads such as appliances or other devices having motors or heating elements are designed to operate on power supplied at a sinusoidally varying voltage (referred to as alternating current or AC). In most of the world, power is generated and transmitted as AC power since the sinusoidally varying voltage can be easily changed using transformers and reduced transmission infrastructure costs and reduced transmission losses can be achieved by using high voltage for transmission and reducing the voltage at a location proximate to the load. AC power is also convenient to generate where the availability of an energy source is substantially constant, for example in fossil fuel, nuclear and hydroelectric powered generators.

However, so-called renewable energy sources such as solar collectors and wind power have become of substantial interest in recent years in order to conserve fossil and nuclear fuels and to avoid environmental pollution and/or reduce the likelihood of accidents and to reduce the need for additional hydroelectric generation facilities which carry a very high initial cost. Renewable energy sources are, by their nature, only intermittently available with highly variable energy delivery and, therefore, generally require some form of power storage as charge in a battery or capacitor bank at a DC voltage which may vary in magnitude with the amount of power stored. Such storage also necessarily requires conversion to AC power if power is to be transferred more than a short distance or coupled to an AC power distribution grid. Therefore a DC to AC power converter capable of operating at very high voltage is generally required.

So-called modular multi-level converters (MMCs) have been increasingly considered for high and medium voltage variable frequency applications since a modular construction facilitates adaptation of a single converter module design to a wide variety and scale of applications such as, for example, interfacing with a power distribution grid or controlling and powering AC motors which must be operated at variable speed by simply assembling and interconnecting modules in accordance with power delivery requirements. However, in normal MMC operation, the capacitors in the respective modules must buffer power fluctuations at line frequency and second order harmonic of the line frequency. This requirement inherently results in a requirement for high value and large size of the module capacitors especially where output line frequency must be variable since capacitor voltage ripple will increase with decreasing frequency and, at a frequency of zero Hz (e.g. DC), becomes infinite. This latter fact is a major issue for AC motor starting where the frequency must increase from zero Hz, especially where high starting torque is required.

It has been proposed to reduce the capacitor energy ripple by shifting the arm (e.g. the portion of the circuit supplying positive or negative half of a given phase of a multi-phase arrangement) currents toward a higher frequency to reduce the capacitor energy ripple by injecting a high frequency sinusoidal circulating (e.g. transferring energy between a capacitor and inductor) current on the respective phases during low frequency operation. However, such an approach increases stress on the switches of the modules and requires converters to be de-rated for low frequency operation while no reduction in capacitor size or value is achieved; limiting the potential power density of the converter modules.

SUMMARY OF THE INVENTION

It is therefore an object of the present invention to provide a new method to control the DC AC (or AC to DC) modular power converter or module therefor which allows reduced capacitor value and size requirements for a given ripple specification and which is capable of operation at low frequencies including DC operation.

It is another object of the invention to decouple the module capacitor ripple from the output line frequency such that capacitor current is controlled at the module switching frequency rather than the line frequency.

It is a further object of the invention to provide a power converter capable of driving an AC motor to develop high torque at start-up.

In order to accomplish these and other objects of the invention, a power converter is provided having an upper arm and a lower arm, each upper and lower arm comprising a switch constituted by a series connected pair of transistors and a capacitor, wherein the power converter module is operated using at least two main switching states for controlling average value of phase current and two further switching states interleaved alternately between the main switching states during which the capacitor is either bypassed or connected to a voltage to charge the capacitor to an offset voltage value such that voltage across the capacitor is controlled toward a reference voltage during the main switching states.

In accordance with another aspect of the invention, a method of operating a modular multi-level power converter (MMC) wherein modules of the MMC each comprise a switch and a capacitor such the said switch controls bypassing the capacitor or connecting the capacitor into the MMC and the MMC includes upper and lower arms wherein each of said upper and lower arms contains at least one said module, wherein the method comprises determining approximate durations of two main switching states in a switching cycle to provide a predetermined output voltage or waveform, and determining approximate durations of two additional switching states in each said switching cycle to charge said capacitor of respective ones of said modules to an offset voltage value such that voltage across each said capacitor is controlled toward a reference voltage during the switching states of a switching cycle.

BRIEF DESCRIPTION OF THE DRAWINGS

The foregoing and other objects, aspects and advantages will be better understood from the following detailed description of a preferred embodiment of the invention with reference to the drawings, in which:

FIG. 6B shows a complete solution of the upper arm currents, FIG. 6C shows a complete solution of the lower arm currents.

DETAILED DESCRIPTION OF A PREFERRED EMBODIMENT OF THE INVENTION

Figure 1:
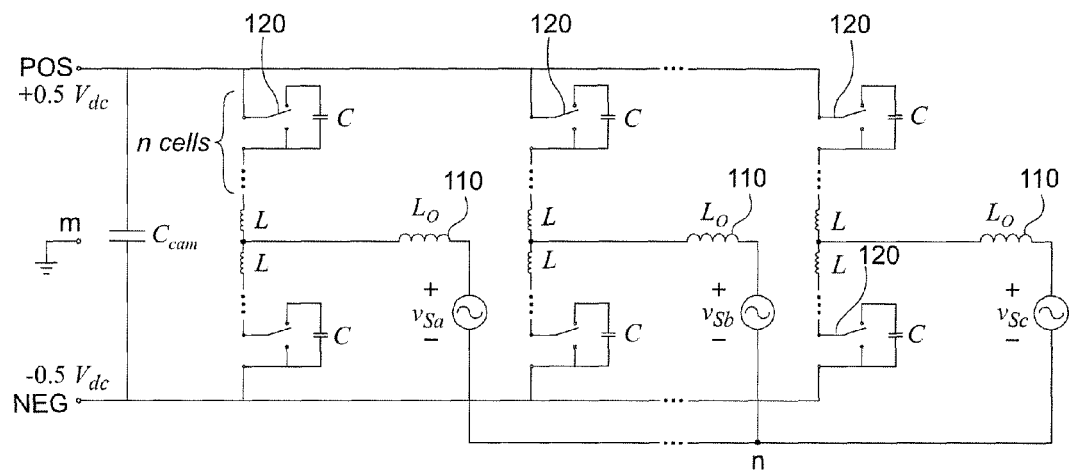
FIG. 1 is a generalized schematic diagram of a modular multi-level converter (MMC)

Referring now to the drawings, and more particularly to FIG. 1, there is shown a generalized schematic diagram of a modular multi-level converter (MMC) to which the invention may be advantageously applied. While the basic architecture of the MMC illustrated in FIG. 1 is known, at the level of detail provided by FIG. 1, the invention may or may not be included since an embodiment including the invention would principally differ from known embodiments by having smaller capacitor and inductor values and sizes for a given ripple specification and different switching control which is only generically depicted in FIG. 1. It should also be noted that in most widely used known MMCs, the common DC capacitor, $C_{com}$, is not necessary and not shown. However, in the switching cycle capacitor voltage control (SCCVC) of the present invention this capacitor is required to absorb switching frequency currents as will be understood from the following discussion although this capacitor may be omitted from other Figures for clarity. Therefore, no portion of FIG. 1 is admitted to be prior art in regard to the present invention.

FIG. 1 illustrates an array of power cells or modules 100 which is extensible to meet any desired specifications for AC power delivery as indicated by triple-dotted portions of connections. (The terms power cell, cell and module are used synonymously and interchangeably hereinafter.) It is contemplated that all modules 100 will be of the same design and maximum current and voltage specifications. Therefore, the number of modules can be increased in the vertical direction (e.g. between the positive and negative DC power busses) to raise the breakdown and operational voltages to exceed the DC input voltage (which must exceed the desired peak-to-peak AC output voltage) as indicated by the vertical triple-dotted connections. The same number of modules 100 should generally be provided between the positive or negative DC bus (which are collectively referred to as the DC-link) and the output node(s) 110. The module or group of modules above or below the output node is referred to as an arm and controls the pulse width modulated application of DC input power to develop a positive or negative half sinusoidal voltage waveform and corresponding current waveform on the output node 110, respectively. The number of phases or branches 120 can also be increased beyond the three phases (six arms) illustrated as may be desired (as indicated by horizontal triple-dotted portions of connections) to deliver the desired current either as separate phases or in parallel or both.

Figure 1A:
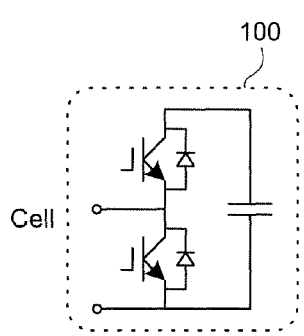
FIG. 1A is a schematic diagram of an exemplary circuit constituting a cell of an MMC depicted as a switch and capacitor in FIG. 1 and other Figures.

The single pole-double throw (SPDT) switches 120 in each module 100 are preferably constituted by two series-connected transistors as shown in FIG. 1A which are operated in a complementary fashion to alternately connect to the upper pole or lower pole of the switch. As a convention herein, "1" will indicate connection to the upper pole and "0" will indicate connection to the lower pole for the switching state S with a subscript of "U" or "L" to indicate the arm in which the switch is located. Additional subscripts (e.g. x, where x=a, b, c, . . . n) may be included to indicate phase but will be omitted for simplicity in discussion of a single phase embodiment illustrated in FIG. 2. These switching states correspond to the conduction states of the series connected transistors constituting the SPDT switches 120 illustrated in each module 100, as alluded to above. That is, $$S_{U(L)x}=1 \text{ when switched to the upper pole ((0 when switched to the lower pole.} \quad (1)$$

Figure 2:
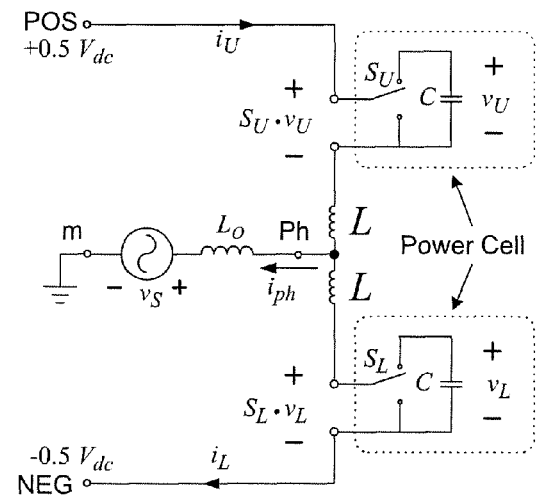
FIG. 2 is a schematic diagram of a single phase MMC with a single module per arm.

Referring now to FIG. 2, operation of a single phase MMC having one module per arm, for simplicity, will now be discussed. The addition of the upper and lower arm currents is referred to as $$i_{sum}=i_U i_L=2i_{cir} \quad (2)$$

where $i_{cir}$ is the circulating current flowing in the loop between the DC-link and the two arms of the MMC (defined as one-half of $i_{sum}$ which is not a real current appearing at any given location in FIG. 2 but is important in analyzing and understanding the operation of a MMC such as that of FIG. 1). The phase or branch current is the difference in currents between the upper and lower arms or $$i_{ph}=i_U - i_L. \quad (3)$$

Based on these definitions of the sum and phase currents and analysis of the circuit of FIG. 2, the current state equations can be derived as:

$$\frac{d}{dt}i_{sum} = \frac{V_{dc} - (S_U v_U + S_L v_L)}{L} \quad (4)$$

$$\frac{d}{dt}i_{ph} = \frac{(S_L v_L - S_U v_U)/2 - v_S}{L_O + L/2} \quad (5)$$

The capacitor voltage equations can then be derived as $$\frac{d}{dt}v_U = \frac{1}{C}S_U i_U = S_U \frac{i_{sum} + i_{ph}}{2C} \quad (6)$$

$$\frac{d}{dt}v_L = \frac{1}{C}S_L i_L = S_L \frac{i_{sum} - i_{ph}}{2C} \quad (7)$$

It should be noted that the critical state variables of the phase current and capacitor voltage are controlled by equations (5), (6) and (7) which determine whether or not the converter can deliver power with sinusoidal phase current and balanced capacitor voltages. However, equation (4) indicates that, if the sinusoidal current power delivery function can be achieved, the sum current or circulating current can be regulated as desired when the states of the upper and lower switches are operated together (e.g. where $S_U + S_L \neq 1$) as will be explained in greater detail below. This facility offers a degree of freedom to influence the arm currents which charge and discharge the capacitors and is thus a principal motivation for the present invention in supporting the function of decoupling the frequency of the circulating current and current and voltage ripple from the (potentially variable) output line current frequency.

Figure 3:
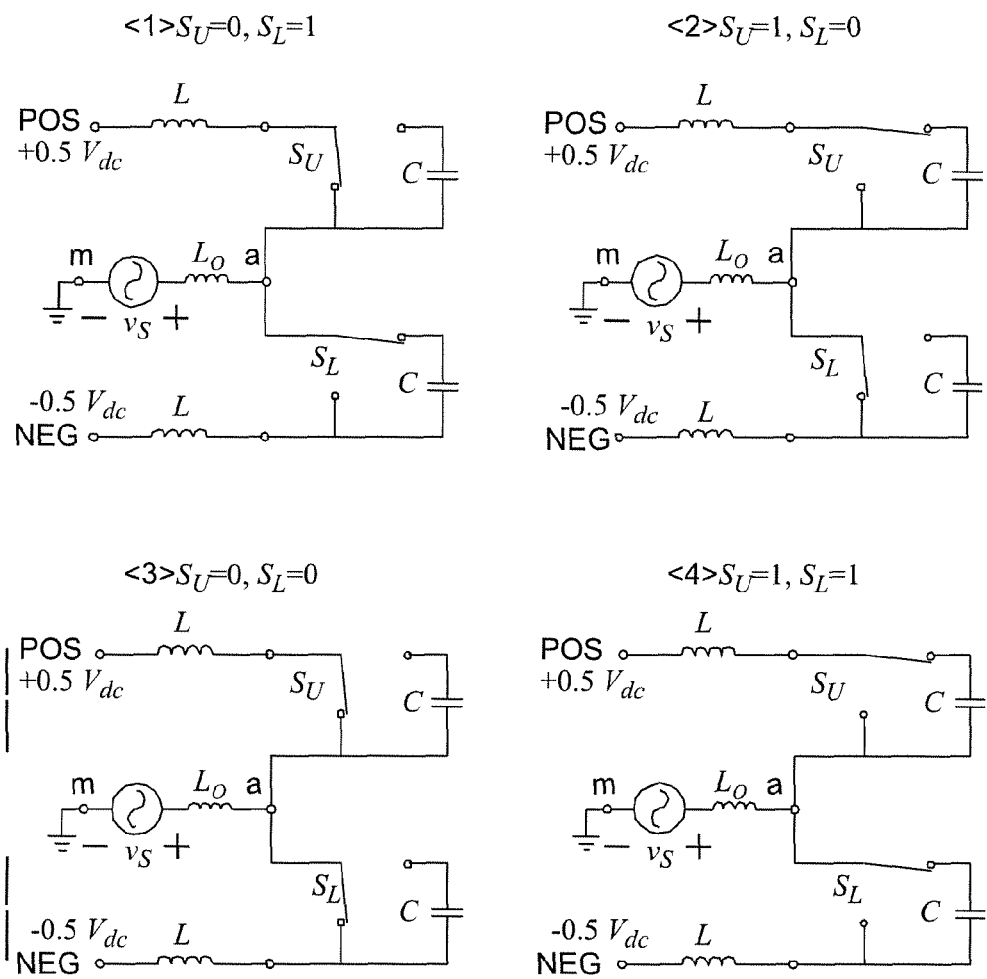
FIG. 3 is a group of schematic diagrams illustrating the four possible switching states of the module of FIG. 2.

More specifically, referring to FIG. 3, the possible switching states of a single phase MMC with a single module per arm as shown in FIG. 2 are illustrated. (In the following discussion, the respective states will be identified by a number enclosed in angle brackets.) The respective values of states $S_U$ and $S_L$ are shown above the schematic diagram showing the SPDT switch positions in each state and corresponding to the values of the state variables, $S_{U(L)}$.

While a total of four combinations of switch states are possible for the MMC shown in FIG. 2, it should be noted that states <1> and <2> have only one capacitor connected in the circuit and control transfer of energy to the load. In states <3> and <4> both capacitors are either connected in or disconnected from the circuit and thus control the sum or circulating current flowing between DC sources and the capacitors. In conventional control approaches, for the MMC, the states that satisfy $$S_U + S_L \neq 1 \quad (8)$$

(which can be generalized to $S_U + S_L \neq n$ for an n-cell per arm MMC converter) are avoided. This is a general statement followed in much of the literature for control of MMC converters. For example, when a cell is bypassed in the upper arm (e.g. $S_U = 0$) a cell in the lower arm will be inserted into the converter (e.g. $S_L = 1$) such that the total number of the inserted cells in a phase leg equals the number of cells in an arm. That is, states <3> and <4>) are intentionally avoided to avoid high peaking currents in the arms and only states <1> and <2> are used to control phase current. That is, if equation 8 is satisfied, the voltage on the two arm inductors will be equal to the power cell capacitor voltage, which could be 1000V or higher across an inductance of 2 mH, for example. This voltage stress on the inductors will cause a very high rising rate of the arm currents. However, from time-to-time during conventional operation, states which satisfy equation (8) occur for very short periods of time caused by the circulating current control loop or certain phase-shifted-carrier pulse width modulation approaches, and generated by the comparison between the carrier and modulation signals without control of when such states may occur. Also, in some conventional MMC control arrangements, a comparatively slow sinusoidal circulating current is introduced which will allow states <3> and <4> to occur. Such arrangements essentially control the "averaged" volts*seconds value of the short states to control the circulating current (or sum current) rather than controlling the actual values of the durations and currents of the short states as is achieved by the present invention. In sharp contrast with known control methods, the switching cycle capacitor voltage control (SCCVC) in accordance with the invention provides specific sequence arrangements and control of all four states in each switching cycle in accordance with capacitor voltages and arm current control being taken into consideration. Thus utilization of states <3> and <4> becomes critical and useful.

Figure 4:
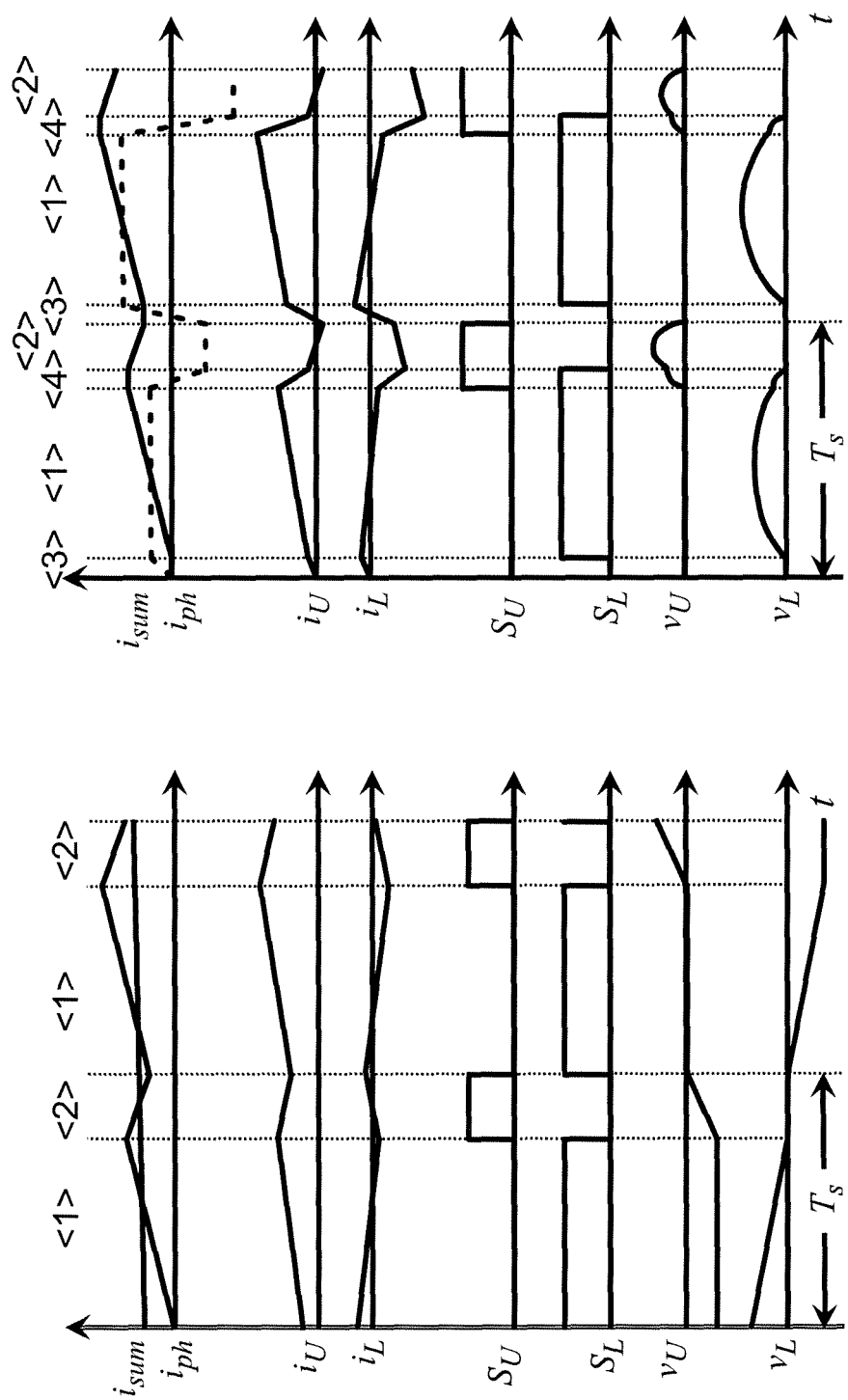
FIG. 4 is a graphical comparison of the waveforms of conventional module control and that of the invention.

More specifically, the concept of SCCVC is to take advantage of the resonance between the arm inductors and the cell capacitors to control the capacitor voltage back to a reference voltage by providing proper initial arm current prior to each of states <1> and <2>. FIG. 4 provides a comparison between the conventional control method (on the left side of FIG. 4) and SCCVC control in accordance with the invention (on the right side of FIG. 4) to demonstrate how capacitor voltage balancing can be achieved within one switching cycle rather than over an output voltage (e.g. line frequency) cycle.

In both the conventional control method and the SCCVC control method it is assumed that the phase current is beginning a positive half cycle. In the conventional control method, as alluded to above, only states <1> and <2> are used in an alternating pulse width modulation (PWM) mode which gradually controls the average value of the phase current to be approximately sinusoidal while the sum current is not impacted by these two states. The unbalanced charges from one switching cycle (as distinct from a line frequency cycle) to another make the capacitor voltages deviate from their original values and return to their initial values only after one AC line frequency cycle.

In contrast, in the SCCVC control method illustrated on the right side of FIG. 4, state <3> is briefly asserted immediately prior to state <1> to control the lower arm (circulating) current to an offset value such that in the (following) time interval of state <1>, the average current flowing through the lower capacitor is controlled toward zero such that the error voltage between average capacitor voltage and a reference voltage is also controlled toward and may be zero. Similarly, state <4> is asserted immediately prior to state <2> to control the upper arm (circulating) current to an offset value such that, during state <2>, the average current flowing through the upper capacitor is controlled toward zero. When the phase current is negative (e.g. during the negative half-cycle of the approximately sinusoidal output waveform), state <4> (instead of state <3>) is inserted before state <1> and state <3> (instead of state <4>) is inserted immediately before state <2>. Thus, in sharp contrast with the conventional control method, the capacitor voltages are returned to their initial state every switching cycle rather than every cycle of the output line frequency which may be variable or even zero (DC), as alluded to above. As can be appreciated from the comparison of FIG. 4 over only the initial few switching cycles (when the output voltage is low), with conventional control, longer durations of the output line frequency cycles allow capacitor currents to build up larger voltages which large capacitances are required to absorb. Therefore, by balancing the capacitor voltages every switching cycle, the ripple voltages and currents will also be at the switching frequency which is necessarily much higher than the line frequency (since the line frequency is developed by PWM at the switching frequency) and the capacitances can be greatly reduced.

The SCCVC methodology can be extended to multiple phases if a DC-link capacitor, $C_{com}$, common to all (e.g. three) phases is placed in the circuit for all the phases since all the circulating currents needed in the SCCVC will be provided by the DC-link capacitor. That is, if the common DC-link capacitor(s) are connected between the positive DC bus and the negative DC bus that are shared by all phases, the current that is needed for achieving the balancing of the capacitors in one phase-leg within the switching cycle can be provided by the common DC-link without affecting behaviors of other phases.

Figure 5:
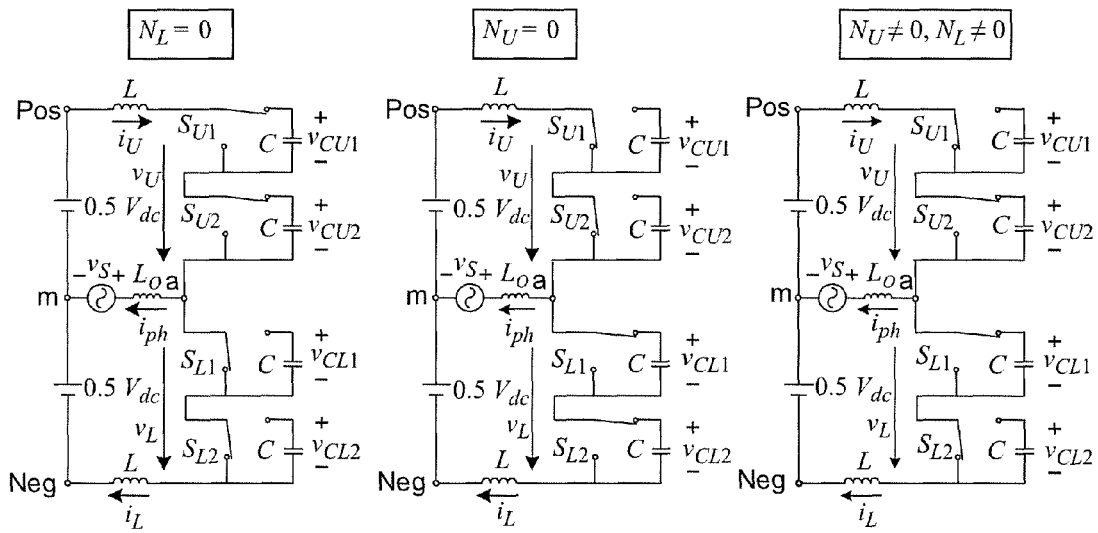
FIG. 5 illustrates exemplary switching states of a MMC having two cells per arm.
Figure 6:
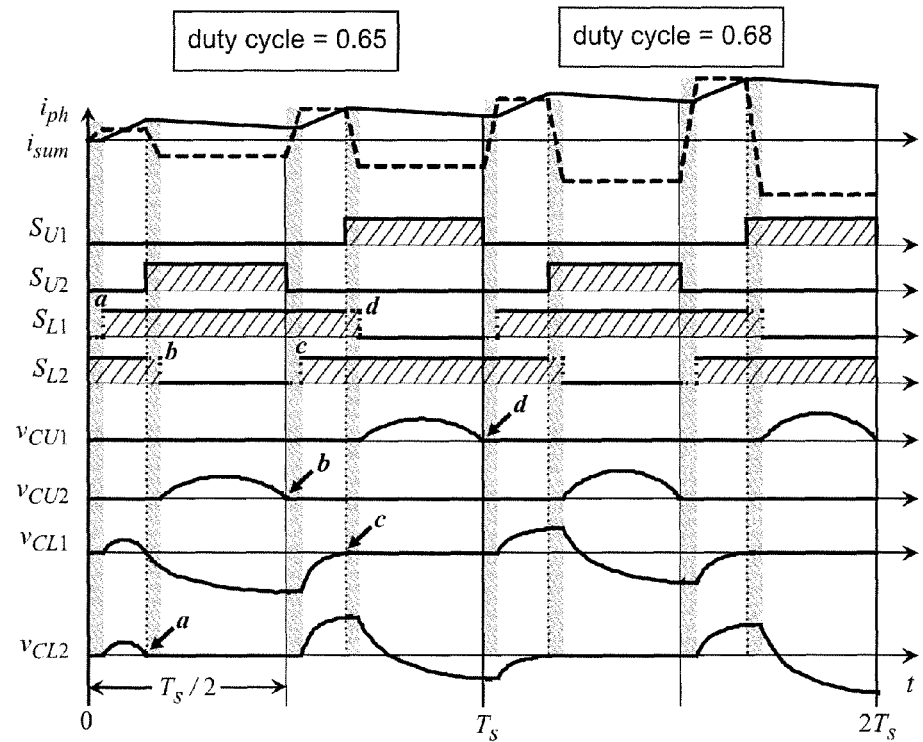
FIG. 6 illustrates operational waveforms of the MMC of FIG. 5.

For MMCs with multiple cells per arm, as illustrated in FIG. 5 (having two modules per arm for simplicity), several switching sequences are possible to introduce states that can quickly change the arm current such that the capacitor voltage can be brought to a reference level at the next switching interval. (In FIG. 5, $N_U$ and $N_L$ in the legends above the schematic diagrams indicates the number of upper or lower capacitors that are connected in the upper and lower arms, respectively. If $N_U$, $N_L$ are not equal to zero, some of the capacitors in the upper arm and/or lower arm are connected.) For example, as shown in FIG. 6 and again assuming that the MMC is at the beginning of a positive half-cycle of the near sinusoidal output waveform, short delays are introduced at every edge of the two lower cell switches as indicated at "a" in FIG. 6. It should be understood that FIGS. 4 and 6 illustrate possible exemplary ways to arrange the states that causes the "shoot-through" which conventional controls did not use or provide. (The term "shoot-through" is used hereinafter as a collective reference to the currents in states <3> and <4> since the large currents caused by the states <3> and <4> resemble shoot-through behaviors that are generally to be avoided even though the term is not entirely accurate because these currents are controlled by the SCCVC methodology of the invention.) However, it should be understood that other approaches to using the additional states will become evident to those skilled in the art from the examples illustrated in FIGS. 4 and 6. If the delay is of proper duration for $S_{L1}$, then the capacitor voltage of $v_{CL2}$ can resonate back to the reference voltage, indicated by arrow "a". Thereafter, the capacitor voltage can remain at the reference voltage when the capacitor is bypassed in the immediately subsequent switching state (e.g. when $S_{L2}=0$). A similar mechanism occurs with delays at "b", "c" and "d". At each of these points, the voltage on a module capacitor is brought back to the reference voltage and remains substantially constant through the subsequent switch state. At t=0, assuming all four capacitor voltages are at a reference voltage, (e.g. 1 kV), with the effect of delay "a", $v_{CL1}$ and $v_{CL2}$ begin to respond in the circuit and both will go back to the reference voltage at arrow "a" if the delay duration of "a" is properly selected which changes the lower arm current charging/discharging the two lower capacitors. The two upper capacitors are unchanged since they are bypassed and apart from the circuit. For the following switching state, $v_{CL2}$ remains constant since capacitor $C_{L2}$ is bypassed. When delay "b" is introduced capacitor $C_{U2}$ is the target capacitor and will be charged/discharged by the upper arm current.

As the lower arm current changes simultaneously with the upper arm current, the capacitor voltage $v_{CL1}$ will respond away from the reference voltage because capacitor $C_{L1}$ is inserted at this switching state. For the next two switching states capacitors $C_{L1}$ and $C_{U1}$ are the targeted capacitors and are controlled back to the reference voltage at the times indicated by arrows "c" and "d", respectively, by using delays "c" and "d". Following this process, all the capacitors have the opportunity to be controlled back to the reference voltage within one switching cycle. The analysis of the resonant interactions causing the initial capacitor voltage to vary from the reference is fairly complex even for the case of two cells per arm and, in any event, a detailed analysis is unnecessary to the successful practice of the invention but is set out in detail in U.S. Provisional Patent application 62/027,551, incorporated by reference above. That analysis, also set out below, is very long and complex and the relationships between the variables are not readily apparent therefrom or easily explained. However, a graphical solution from which the invention can be practiced, although not optimally, is illustrated in FIG. 6A and which may be of assistance in understanding the detailed analysis given below which is important to the optimal design of the capacitance and inductance values, switching frequency and the like.

It should be understood that the preceding discussion is intended to demonstrate an exemplary use of the "shoot-through" states in addition to one type of pulse width modulation (PWM) control. The generation of the "shoot-through states includes but is not limited to such delays or advances or any other methods and the PWM pattern is not limited to that shown in FIG. 6 where a phase shifted carrier modulation technique is used. The capacitor control sequence is also not limited to that of the foregoing example where "a", "b", "c" and "d" are controlled by one another.

Figure 6A:
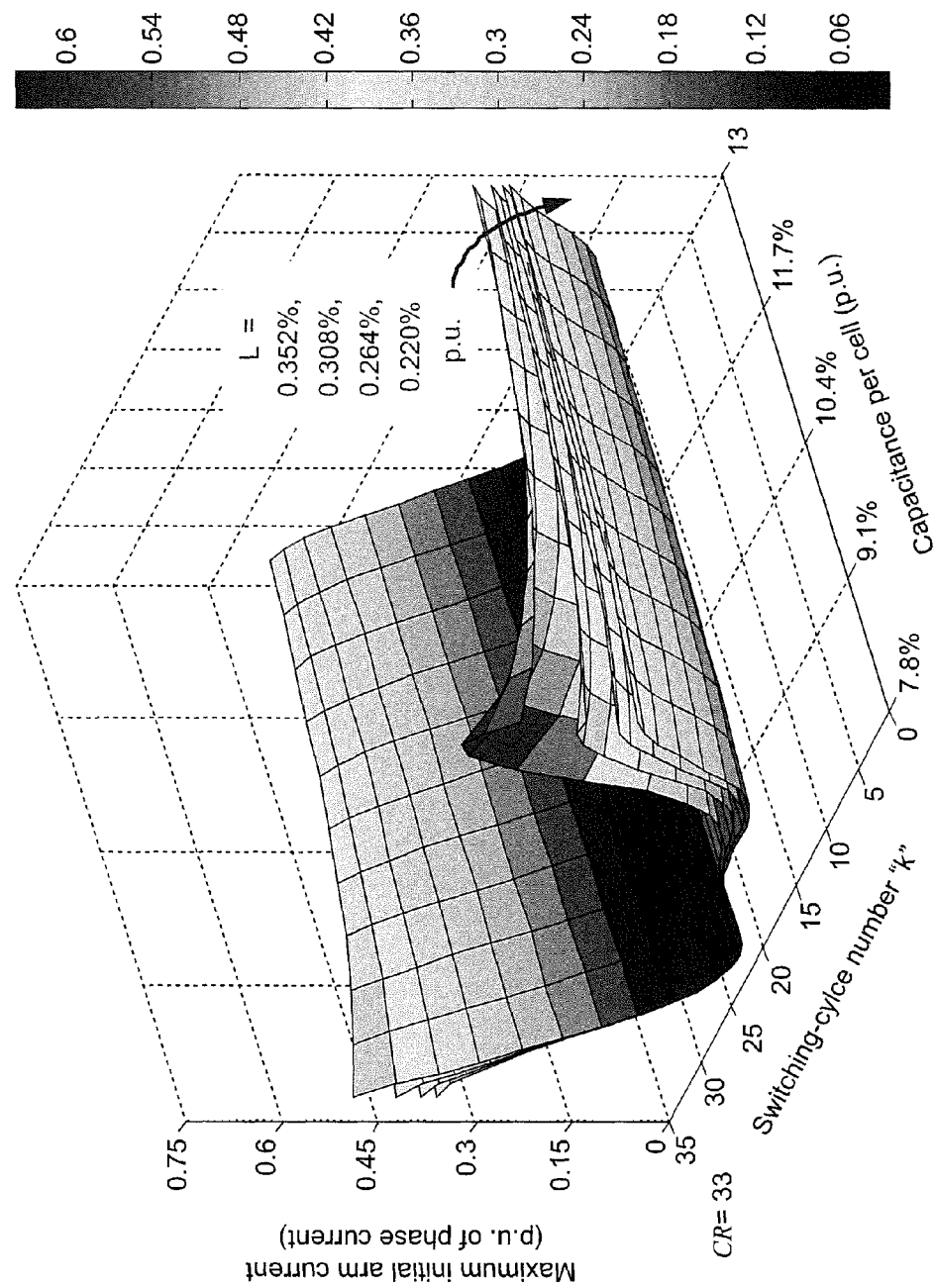
FIG. 6A illustrates a graphical solution of differential equations derived from an analysis of resonant interactions in accordance with the invention.

FIG. 6A is a three-dimensional plot which illustrates the mathematical relationship between the cell capacitance, C, arm inductance, L, the number of switching cycles (e.g. within an AC line frequency cycle) and the calculated initial arm current, $i_{Umax}$ or $i_{Lmax}$ using equations (18) and (19) for a single cell per arm case. The initial arm current is the current created by the "shoot-through" states <3> and <4> to achieve capacitor voltage balancing. The value of the initial current can differ between switching cycles within a complete fundamental line frequency cycle (as can be observed in 6) and reaches a maximum at a switching cycle determined by the duty-cycle value and the load power factor and will differ from case-to-case. Lower maximum initial arm currents correspond to lower power losses consumed by the switching devices and more efficient converter performance. It should also be observed from FIG. 6A that larger capacitance values (but still far below capacitance values required in the absence of the invention to achieve comparable capacitor voltage ripple) and smaller inductance values will result in reduced maximum initial arm current.

Essentially, the above analysis provides an approximation of the two resonant frequencies which indicate the physical meaning of the resonant behavior of the capacitors and inductors. The relatively faster resonance between the series connection of the two equivalent arm capacitors and the inductors determines the basic behavior of the circuit while the lower frequency fundamental resonance component will have a lesser but non-negligible impact on the time-domain response. The two time-domain arm current expressions in the above-incorporated provisional patent application (in which $\omega_0$ is the fundamental frequency of the phase current and k is the identifier of the switching cycle in the entire fundamental line cycle) allow calculation of capacitor voltage response, or to solve for the initial arm current value needed to balance the capacitor voltages and the impact on other capacitors while the SCCVC is seeking to balance any given capacitor.

More specifically, from the circuit diagram of a two cell per arm MMC converter ($N_{cell}=2$) at different switching states of FIG. 6, the state-space differential equation is derived as equation (9) using $i_U$, $i_L$, $v_U$ and $v_L$ since those state variables have clear physical definitions.

$$\frac{d}{dt}\begin{bmatrix} i_U \\ i_L \\ v_U \\ v_L \end{bmatrix} = \begin{bmatrix} 0 & 0 & -\frac{1}{L_1} & \frac{1}{L_2} \\ 0 & 0 & -\frac{1}{L_2} & -\frac{1}{L_1} \\ \frac{1}{C_U} & 0 & 0 & 0 \\ 0 & \frac{1}{C_L} & 0 & 0 \end{bmatrix}\begin{bmatrix} i_U \\ i_L \\ v_U \\ v_L \end{bmatrix} + \begin{bmatrix} \frac{0.5V_{dc}}{L} - \frac{V_S\sin(\omega_0 t + 2\pi \cdot k/CR)}{2L_O+L} \\ \frac{0.5V_{dc}}{L} + \frac{V_S\sin(\omega_0 t + 2\pi \cdot k/CR)}{2L_O+L} \\ 0 \\ 0 \end{bmatrix} \quad (9)$$

$$N_U = \sum_{i=1}^{N_{Cell}} S_{Ui}, \; N_L = \sum_{i=1}^{N_{Cell}} S_{Li} \quad (10)$$

$$v_U = \sum_{i=1}^{N_{Cell}} S_{Ui} \cdot v_{Ui}, \; v_L = \sum_{i=1}^{N_{Cell}} S_{Li} \cdot v_{Li} \quad (11)$$

$$\frac{1}{C_U} = \frac{N_U}{C}, \; \frac{1}{C_L} = \frac{N_L}{C} \quad (12)$$

$$L_1 = \frac{L(2L_O+L)}{L_O+L}, \; L_2 = \frac{L(2L_O+L)}{L_O} \quad (13)$$

A simplification of equation (9) can be made when $N_U$ or $N_L$ equals zero and, consequently, one of the two terms in equation (12) also equals zero. The two resonant frequencies are $$\omega_{r1} = \sqrt{\frac{C_U+C_L}{2C_U C_L L_1} + \frac{\sqrt{C_L^2 L_2^2 + 4C_U C_L L_1^2 - 2C_U C_L L_2^2 + C_U^2 L_2^2}}{2C_U C_L L_1 L_2}} \quad (14)$$

$$\omega_{r2} = \sqrt{\frac{C_U+C_L}{2C_U C_L L_1} - \frac{\sqrt{C_L^2 L_2^2 + 4C_U C_L L_1^2 - 2C_U C_L L_2^2 + C_U^2 L_2^2}}{2C_U C_L L_1 L_2}} \quad (15)$$

which can be approximated as $$\omega_{r1} \approx \sqrt{\frac{1}{2L}\left(\frac{1}{C_U}+\frac{1}{C_L}\right)} \quad (16)$$

$$\omega_{r2} \approx \sqrt{\frac{1}{4L_O}\left(\frac{1}{C_U}+\frac{1}{C_L}\right)} \quad (17)$$

indicating the physical meaning of the resonant behaviors of the capacitors and inductors. The relatively faster resonance in equation (16) between the series connection of the two equivalent arm capacitors and the series connection of the two arm inductors determines the basic behavior of the circuit while the lower frequency resonance or fundamental component expressed in equation (17) has a minor but not negligible effect on the time-domain response.

With the resonant frequencies thus approximated, the complete solution of the upper and lower arm currents is given by equations (18) (shown in FIG. 6B) and (19) (shown in FIG. 6C), respectively, where $\omega_0$ is the fundamental angular frequency of the line current.

With the two arm current expressions thus derived, it is straightforward to calculate any capacitor voltage response during the time interval of any switching state. Also, the current expressions can be used to solve for the initial arm current value needed to balance the capacitor voltages. Further, while the control is seeking to balance one of the arm capacitors, the impact on the other arm capacitor(s) can also be derived.

The above-incorporated provisional patent application also summarizes a State-space switching model (SSSM) described in detail in "State-space Switching Model of Modular Multilevel Converters" by J. Wang et al., 2013 IEEE 14$^{th}$ Workshop on Control and Modeling for Power Electronics Converters (COMPEL), pp. 1-10, which is hereby also incorporated by reference in its entirety. The SSSM given for a three phase MMC is the most accurate model with no assumptions other than Kirschoff's voltage and current laws of the circuit of FIG. 1. In the process of discretization of the continuous SSSM, the Euler approximation can be used if the time-step is sufficiently short. As is known, in mathematics and computational sciences, the Euler approximation method is a numerical procedure to discretize the ordinary differential equations and to solve them with given initial values. The time-step is the interval when the variables in the equations is piece-wise linearized. The local error or error per time-step of this method is proportional to the square of the step size and the global error is proportional to the step size. Thus, a time-step is considered to be sufficiently short when the global error is acceptable.)

Comparing the time domain arm current approximation expressions with the SSSM approach, the three-phase SSSM approach is more accurate since it considers the circulating current interactions between the phases and the common mode voltage between the neutral and the DC-link midpoint. However the single phase arm current approximation expressions are sufficiently accurate for digital control of the PWM pulse durations in the respective switching states as will now be discussed.

Figure 7:
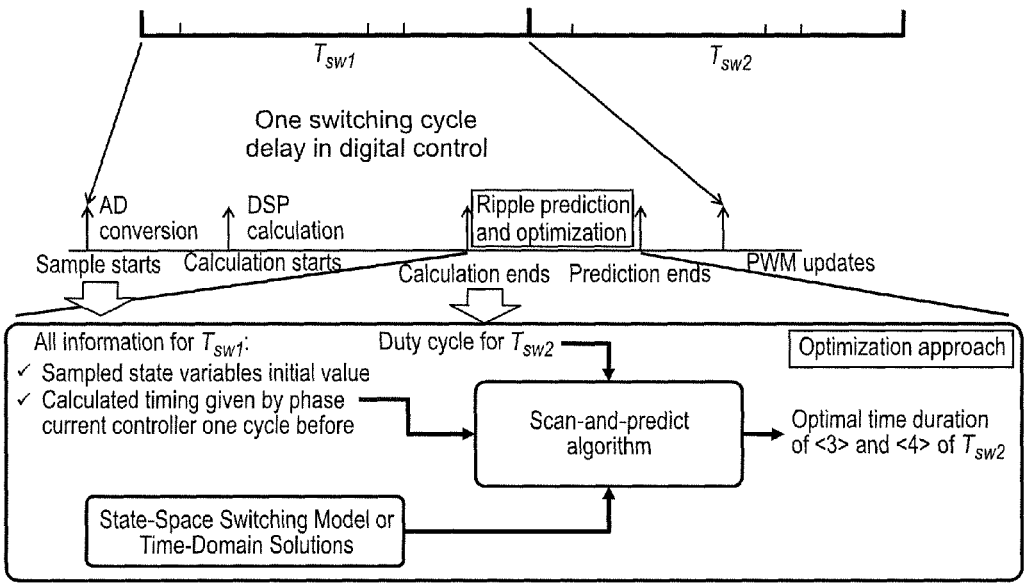
FIG. 7 illustrates the principle of operation of an exemplary model-predictive control for the modules in accordance with the invention.

It is well-known that there is always one switching cycle delay in digital controllers for determining PWM switching state durations. This delay restrains application of the SCCVC methodology as described above since the values of the state variables are sampled at the end of $T_{SW1}$ and used for the control at $T_{SW2}$ as illustrated in FIG. 7. To address this issue, prediction of the dynamics of the state variables is necessary for digital control of the SCCVC process and is referred to as a model-predictive control (MPC) process. Other digital or analog techniques will be apparent to those skilled in the art in view of the following discussion for realizing SCCVC in accordance with the invention and can be applied in particular applications but digital model predictive control is much preferred.

MPC is preferably performed in two steps. First, the state variable values including all the capacitor voltages and inductor currents in the converter at the end of $T_{SW1}$ are calculated based on the data sampled at the beginning of $T_{SW1}$ and the time durations of each of the switching scenarios (e.g. the different orders of switching states for the positive and negative half cycles of the output) given in the previous cycle by using either the time-domain current approximations or the SSSM as discussed above. The second step is to determine the time durations of all of the switching states, for example, the <3>, <2>, <4>, <1> sequence. A trial-and-error method is then performed as a scan-and-predict algorithm to derive the prediction forming the best solution. Therefore, the time durations of the <1> and <2> switching state in the conventional control method can be calculated in a known manner using equations (18) and (19) above or the State-Space Switching model using equations (20)-(23) as follows:

$$\begin{cases} \dfrac{d}{dt}i_{dc} = \dfrac{1}{2L}\left[3V_{dc} - \sum_{x=a,b,c}\sum_{i=1}^{n}(S_{Uxi}v_{Uxi} + S_{Lxi}v_{Lxi})\right] \\ \dfrac{d}{dt}i_a = \dfrac{1}{L/2}\left[\sum_{i=1}^{n}(S_{Lai}v_{Lai} - S_{Uai}v_{Uai})/2 - v_{Sa} - v_{nm}\right] \\ \dfrac{d}{dt}i_b = \dfrac{1}{L/2}\left[\sum_{i=1}^{n}(S_{Lbi}v_{Lbi} - S_{Ubi}v_{Ubi})/2 - v_{Sb} - v_{nm}\right] \\ \dfrac{d}{dt}i_{cira} = \dfrac{1}{6L}\left[\begin{array}{c}\sum_{x=a,b,c}\sum_{i=1}^{n}(S_{Uxi}v_{Uxi} + S_{Lxi}v_{Lxi}) - \\ 3\sum_{i=1}^{n}(S_{Uai}v_{Uai} + S_{Lai}v_{Lai})\end{array}\right] \\ \dfrac{d}{dt}i_{cirb} = \dfrac{1}{6L}\left[\begin{array}{c}\sum_{x=a,b,c}\sum_{n=1}^{n}(S_{Uxi}v_{Uxi} + S_{Lxi}v_{Lxi}) - \\ 3\sum_{i=1}^{n}(S_{Ubi}v_{Ubi} + S_{Lbi}v_{Lbi})\end{array}\right] \end{cases}$$ (20)

$$\dfrac{d}{dt}v_{Uxi} = \dfrac{1}{C}S_{Uxi}i_{Ux}$$ (21)

$$\dfrac{d}{dt}v_{Lxi} = \dfrac{1}{C}S_{Lxi}i_{Lx}$$ (22)

$(i = 1, \ldots, n)$
where $$v_{nm} = \dfrac{1}{6}\sum_{x=a,b,c}\sum_{i=1}^{n}(S_{Lxi}v_{Lxi} - S_{Uxi}v_{Uxi})$$ (23)

Figure 8:
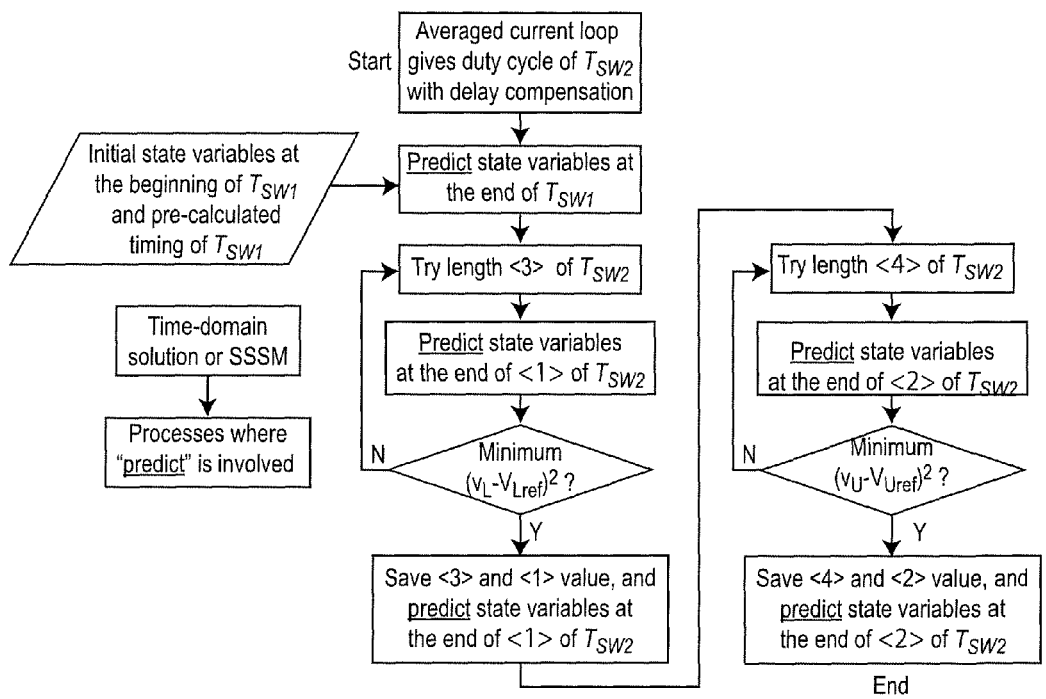
FIG. 8 is a flow chart of the model-predictive control algorithm.

Since the durations of states <3> and <4> are both very short delays limited to less than 15 μsec due to the very small arm inductance, L, a 1 μsec time step is sufficient to scan for the best duration of switching state <3>. Using either the time-domain arm current approximations or the SSSM approximation as discussed above, the (lower) capacitor voltage, $v_L$, at the end of state <3> can be calculated for different durations of that switching state. By trying different durations, the optimal duration will be the duration producing a minimum value for $(v_L - V_{ref})^2$ which can then be used to modify the duration of switching state <1>. Then, all the state variable values at the end of state <1> can be calculated using the arm current approximations or SSSM which can be used similarly for calculating the optimal duration of switching state <4> (e.g. finding the duration producing the minimum value of $(v_U - V_{ref})^2$) that can then be used to modify the duration of state <2>), and so on as illustrated in the flow chart of FIG. 8. Since only a small number of time steps need to be computed for the maximum duration of switching states <3> and <4> and further time step calculations can be omitted after a minimum value of $(v_L - V_{ref})^2$ or $(v_U - V_{ref})^2$ is found, all processes can be carried out during switching cycle period $T_{SN1}$.

It should be noted that due to the insertion of states <3> and <4>, the originally calculated PWM duty cycles may or may not be slightly changed. Since the durations of states <3> and <4> are very short (particularly because a much smaller value of capacitors and arm inductances can be used as will be discussed below), the duty cycle need only be slightly changed, if at all, before being provided to the PWM modulator. Therefore, there will be very little change, if any, in the state variable responses since the cycle times of their resonant frequencies are very much longer than the time duration of states <3> and <4>.

To demonstrate the efficacy of the invention, a simulation has been performed using the converter specification given in the following table.

| | |
|---|---|
| Apparent power | 200 KVA |
| Power Factor | Unity |
| Line-to-line Grid Voltage | 1140 Volts |
| Line Current | 100 Amperes |
| DC-bus voltage | 200 Volts |
| Cell count per arm | 2 |
| Cell DC Link Voltage | 1000 Volts |
| Cell DC-Link Voltage Ripple | −50 V~+50 V |
| Capacitance pre Cell | 400 μF |
| Arm inductance | 20 μH |
| Line inductance | 2000 μH |
| Line frequency | 60 Hz |
| Switching frequency | 33 * 60 Hz |

The 1 kV DC-Link voltage is selected in order to use a low cost 1.7 kV IGBT module. The cell number in each arm is selected to simply demonstrate the operation waveforms without being too complicated to be observed and understood. However, it should be appreciated that the SCCVC can be extended to any number of cells per arm to accommodate higher voltage requirements.

Figure 9:
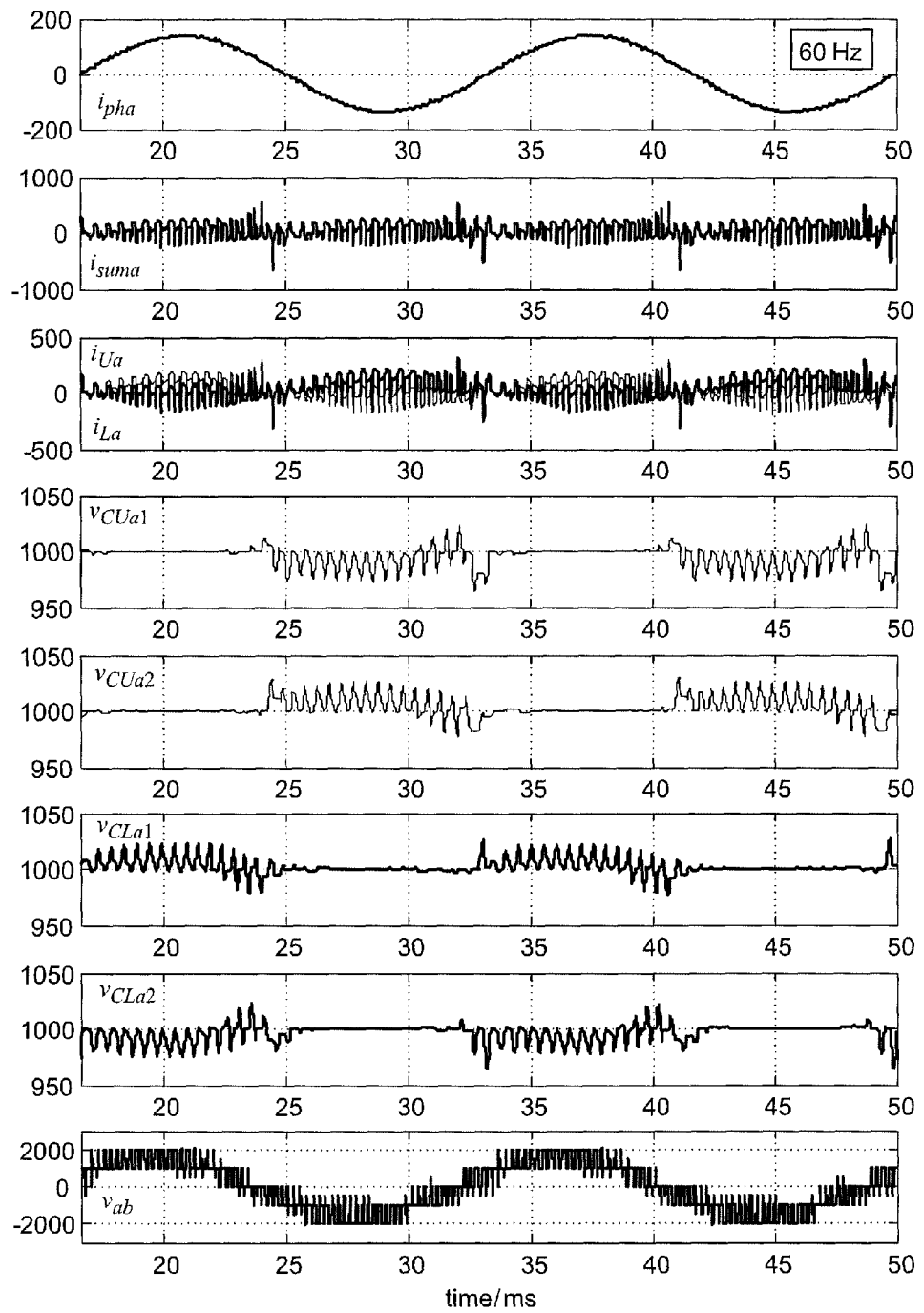
FIGS. 9 and 10 illustrate waveforms of the operation of the invention at output line frequencies of 60 Hz and 1 Hz, respectively.

The simulation results for 60 Hz line frequency are shown in FIG. 9. It should be noted that the line current is controlled to follow the specified line current and that a number of intermediate line voltage levels are produced (e.g. ±500 volts, ±1500 volts, etc.) caused by the newly inserted states in accordance with the invention, as shown in the $v_{ab}$ waveform. In the SCCVC, the averaged PWM duty cycles are maintained as originally required for the averaged line current control as for the conventional control technique (to assure that the phase current is substantially sinusoidal without distortion) and, therefore, there are no low order harmonic distortions of the line-to-line voltage and no low frequency distortion appearing on the phase current. (The averaged duty cycle will be influenced somewhat by the "shoot-through" state in the SCCVC and some compensation may be applied but doing so is not important to the successful practice of the invention.) The sum current is controlled to indirectly regulate the cell capacitor voltages to be certain that the cell capacitor voltages return to the reference voltage; 1000 V in this case.

Figure 10:
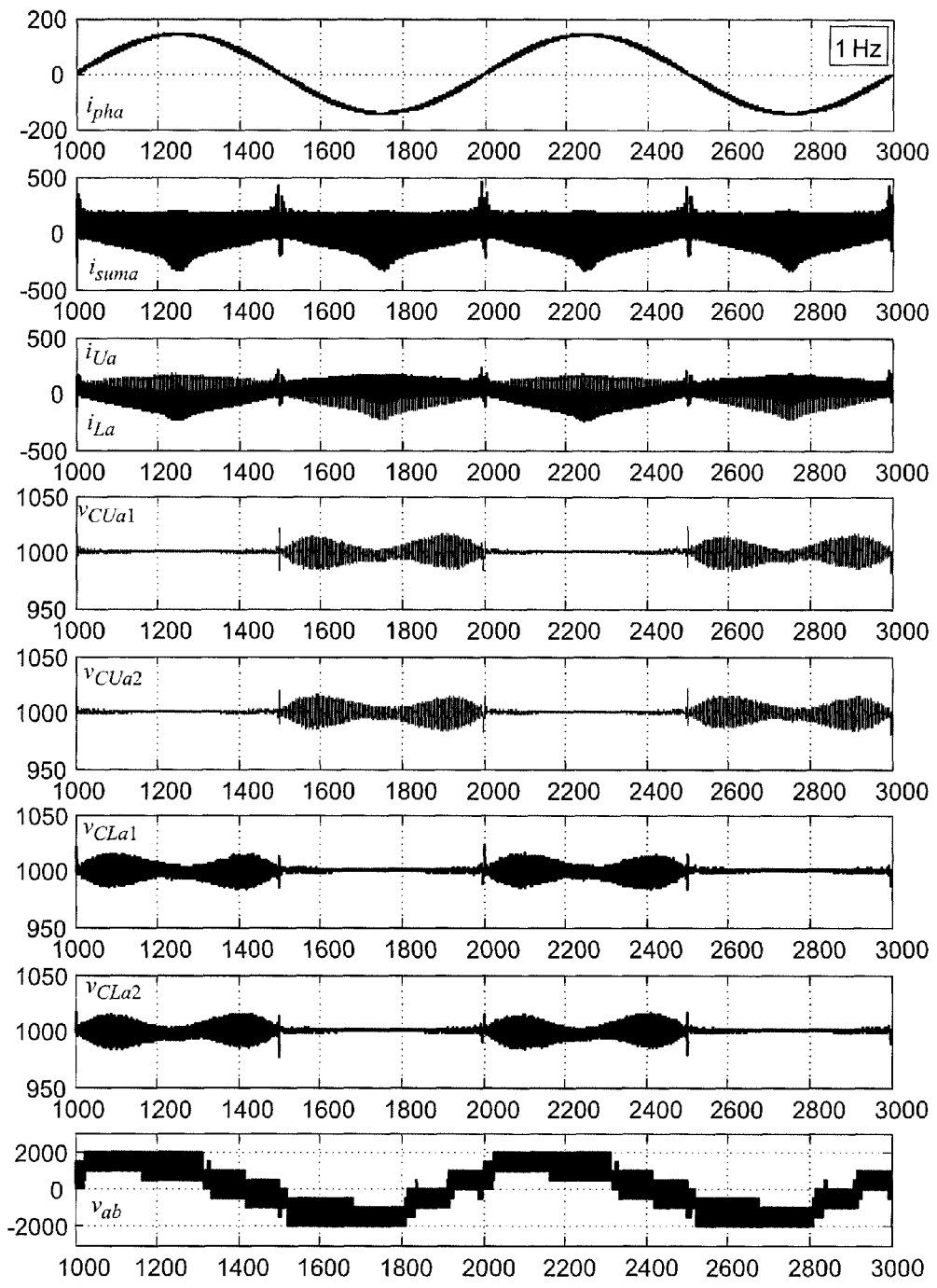

FIG. 10 illustrates results of a simulation under the same specifications and conditions as in the simulation results depicted in FIG. 9 except that the line frequency is 1 Hz. The similarity to FIG. 9 demonstrates that the SCCVC in accordance with the invention substantially eliminates dependency on line frequency to balance the cell capacitor voltages since the capacitor voltage ripple is substantially the same as for the 60 Hz simulation and there are no low order harmonic distortions on the line-to-line voltage.

Importantly, it should be noted that the specified cell capacitance value is 400 μF and the arm inductance is 20 μH which is substantially reduced from the conventional control case where a 4 mF capacitance and a 1 mH arm inductance would be required to achieve the same capacitor ripple voltage. Accordingly, it is seen that the SCCVC in accordance with the invention can not only provide capacitor current balancing at the PWM switching frequency rather than the line frequency but decouples the power converter control and operation from the line frequency altogether and allows the capacitor and arm inductor values and physical size to be greatly reduced; resulting in a potentially large increase in power density of an MMC. Moreover, since the MMC using SCCVC is independent of the line frequency, operation at a line frequency of zero Hz is possible; allowing, for example, AC motors to be started with high torque.

Figure 11:
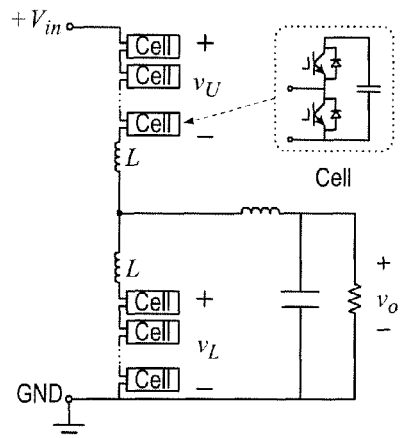
FIGS. 11 and 12 are schematic diagrams of a modular multilevel buck converter (MMBC) in accordance with a variant embodiment of the invention for DC/DC power conversion.
Figure 12:
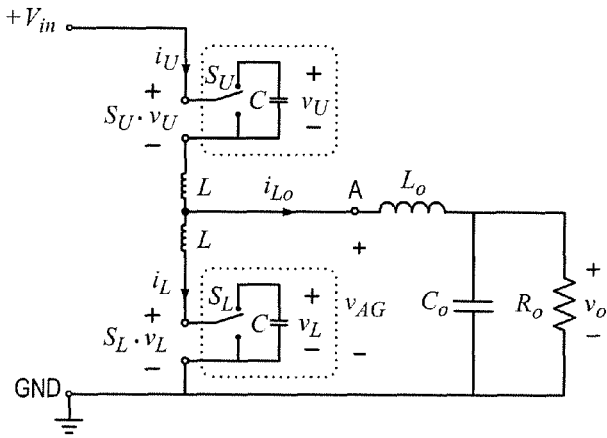

As alluded to above, the SCCVC in accordance with the invention is capable of balancing capacitor cell voltages essentially without dependency on AC line frequency and thus can operate at an AC line frequency of zero (e.g. DC). For applications requiring conversion between DC voltages as might be presented, for example, by a need for reduction of a high DC voltage at which power is stored to an intermediate or low DC voltage for local distribution on a DC grid or direct use. The SCCVC in accordance with the invention can provide such a function without an intermediate AC stage and can thus achieve an increased power density of such converters. As alluded to above, a given module of an MMC or a series connected string of such modules can basically be regarded as being equivalent to a switch. Such switches may then be employed in any power converter topology such as the simple buck converter to form a modular multilevel buck converter (MMBC) depicted generically in FIG. 11 and in a single cell per arm configuration in FIG. 12 (with the two semiconductor switches depicted as a single-pole, double-throw switch, as discussed above) which is often employed for DC/DC power conversion. Other DC converter DC power converter topologies can also be employed and are referred to generically and collectively as modular multilevel DC (MMDC) converters.

Figure 13:
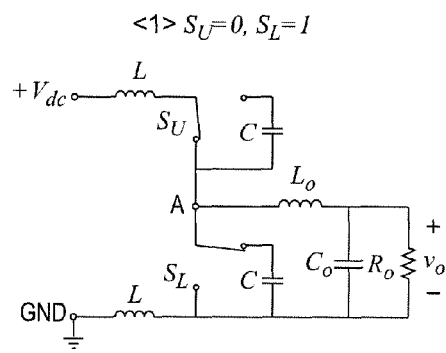
FIG. 13 illustrates four switching states of an MMBC similar to FIG. 3.
Figure 13:
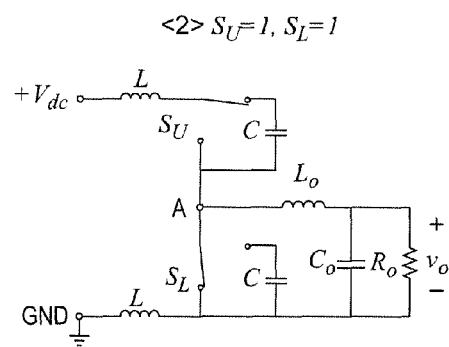
Figure 13:
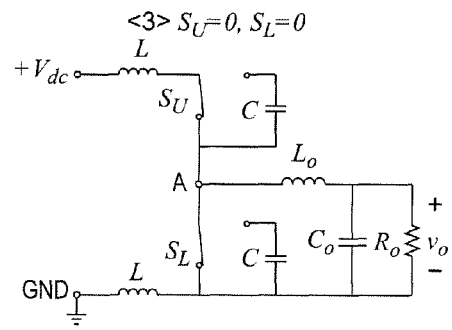
Figure 13:
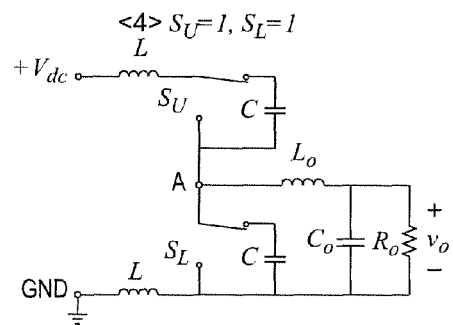

The four switching states of the MMBC are depicted in FIG. 13 in a form very similar to that of FIG. 3 discussed above. As before, switching states <1> and <2> are conventionally used but, in accordance with SCCVC, switching states <3> and <4> are also used as discussed above. The basic difference between MMDC operation and operation of MMCs for DC/AC conversion is the simplified control for DC voltage regulation rather than generation of a sinusoidal waveform. Therefore, since there is no current reversal in MMDCs, only one sequence of states is required and, since states <3> and <4> are of very short duration, standard modulation techniques such as pulse-width modulation (PWM) by comparison of an output voltage and reference voltage with a ramp function of a chosen switching frequency in a feedback loop is generally sufficient for voltage regulation, with or without compensation for the duration of states <3> and <4>. The above analysis and design equations are fully applicable to MMDCs but may be simplified to a state variable transformation of $$i_{cir} = (i_U + i_L)/2$$

$$i_{Lo} = i_U - i_L. \qquad (24)$$

The state-space model of the MMBC is then $$\begin{cases} \dfrac{d}{dt} i_{cir} = \dfrac{V_{dc} - (S_U v_U + S_L v_L)}{2L} \\ \dfrac{d}{dt} v_U = S_U \dfrac{i_{cir} + i_{Lo}/2}{C} \\ \dfrac{d}{dt} v_L = S_L \dfrac{i_{cir} - i_{Lo}/2}{C} \\ \dfrac{d}{dt} i_{Lo} = \dfrac{\dfrac{V_{dc}}{2} + \dfrac{(S_L v_L - S_U v_U)}{2} - v_{Co}}{L_O + L/2} \\ \dfrac{d}{dt} v_{Co} = \dfrac{i_{Lo} - v_{Co}/R_o}{C_o} \end{cases} \qquad (25)$$

Given an initial condition of the buck converter current, $i_{Lo}$, and circulating current, $i_{cir}$, the capacitor voltage response and inductor current response in any time interval can be expressed by solving differential equations (21) is the respective switching scenarios or states, respectively. Even for an arbitrarily large number of cells in the respective MMBC arms, a fourth-order state-space model is sufficient to describe all the voltage and current behaviors in every switching state (e.g. in accordance with equations (9)-(19), above). With those solutions and the information of different switching frequencies and the steady-state duty cycle, the quantitative relationship between capacitance value, inductance value as well as the duty cycle and switching frequencies can be derived and used in a manner conceptually similar to that discussed above.

Figure 14:
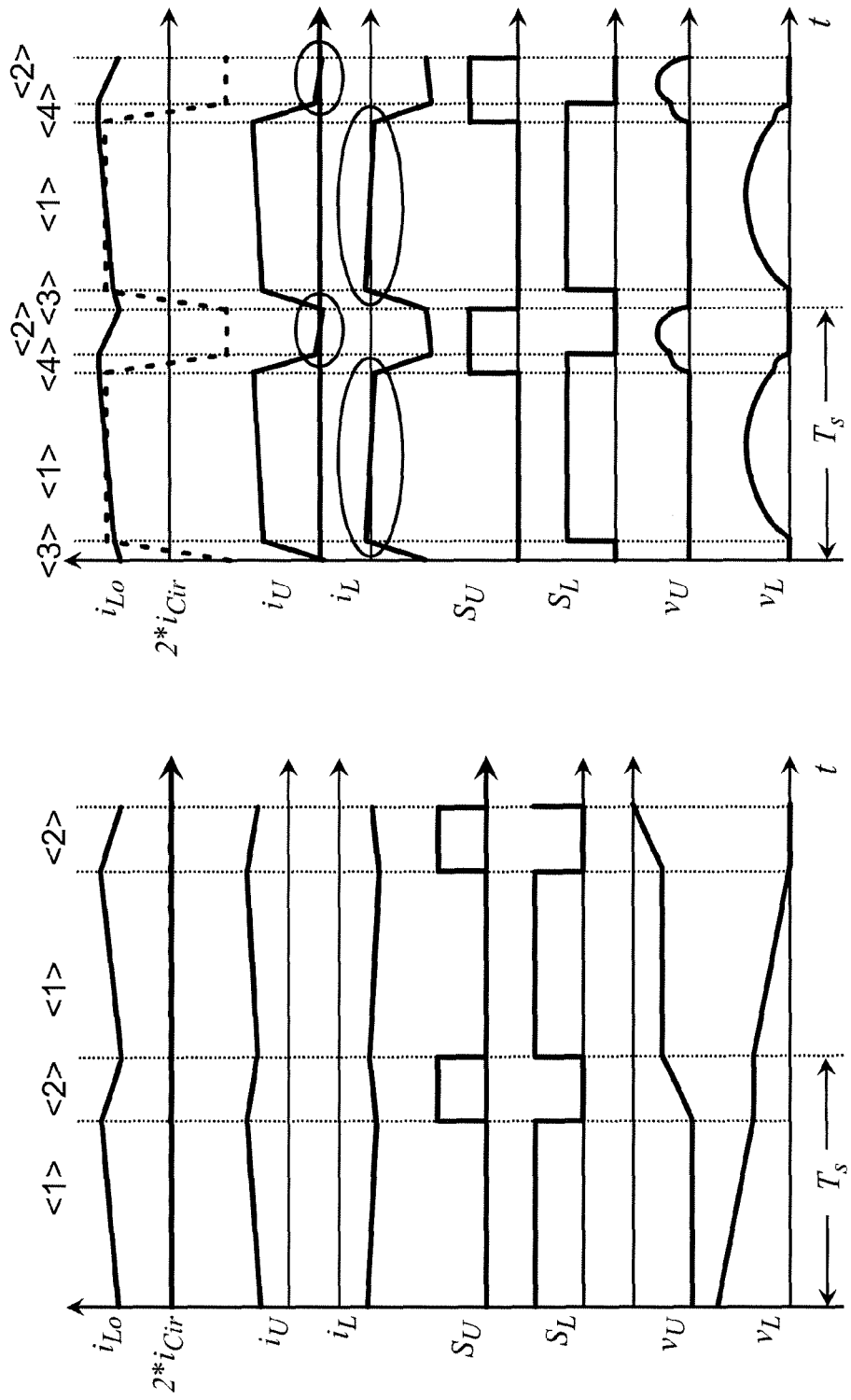
FIG. 14 is a comparison of conventional and SCCVC control for an MMBC.

Since the expressions for the behaviors of even a single-cell-per-arm are lengthy and complicated and the computational burden is increased exponentially for multi-cell per arm circuits, a model predictive control (MPC) as described above is also preferred for realization of SCCVC in MMDCs. A comparison of conventional control and SCCVC control in accordance with the invention is illustrated in FIG. 14. Again, it is clearly seen that the capacitors can be re-balanced within a single switching cycle by use of SCCVC in accordance with the invention.

It should be noted that, due to the insertion of states <3> and <4>, the originally calculated duty cycles may be slightly changed and compensations made after the durations of states <3> and <4> are computed. However, since these states are very short, little, if an, compensation is generally required in the state variable response since the resonant frequencies are generally much longer than the durations of states <3> and <4>.

Figure 15:
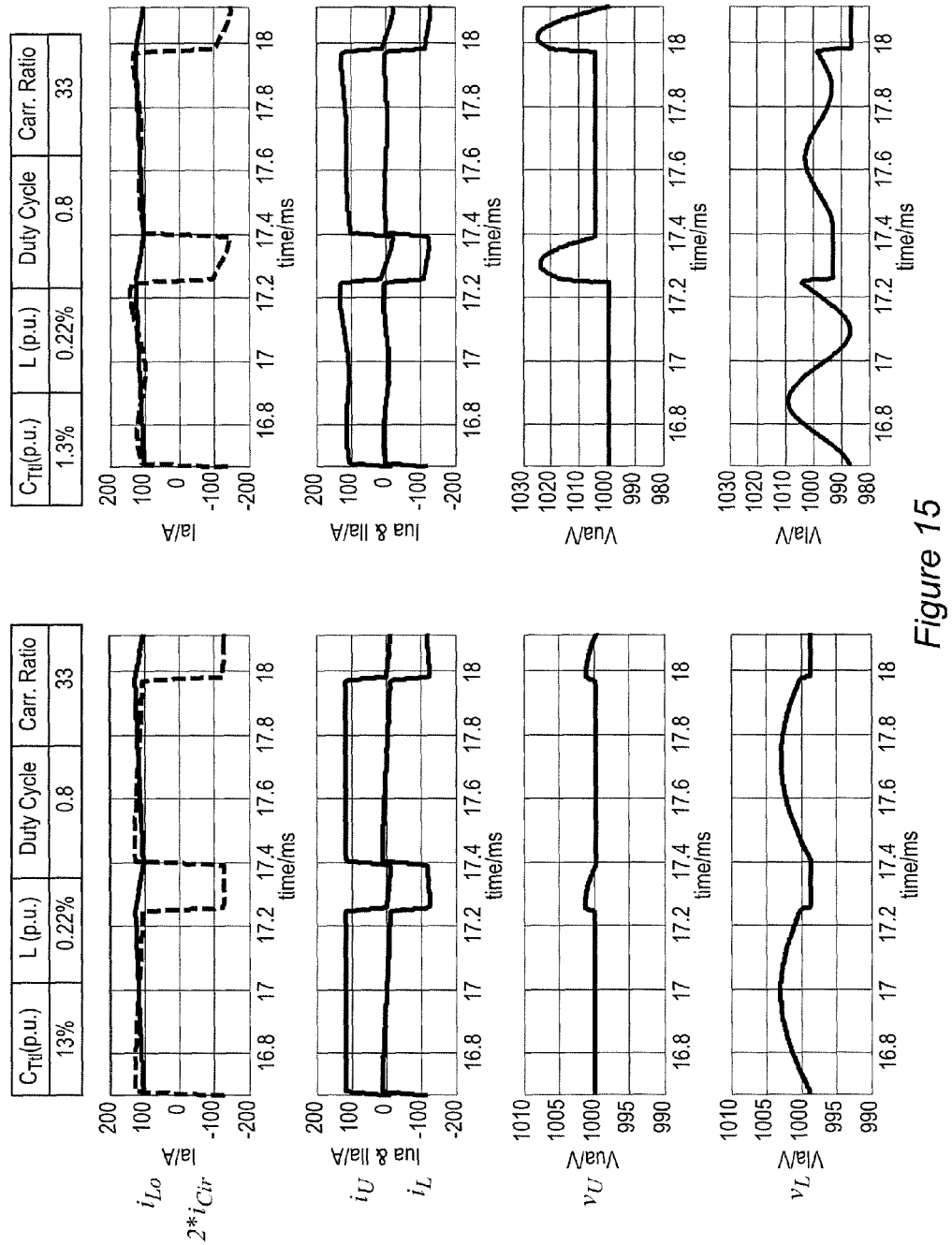
FIG. 15 illustrates simulation waveforms for a one cell per arm MMBC.

Simulation waveforms over two switching cycles of a one cell per arm MMBC are shown in FIG. 15. for 13% per unit (p. u.) and 1.3% p. u. capacitance values. The term "per unit" indicates the percentage of capacitive reactance at 60 Hz referred to the load resistance (which may not appear to be entirely appropriate for a DC-DC MMC embodiment since there is no 60 Hz current or voltage in a DC-DC application but is appropriate here since the DC-DC embodiment is essentially a special case of the DC-AC MMC embodiment and is used here to reflect the possible capacitance reduction characteristic of the DC-AC embodiment of the invention discussed above and that, if the same capacitance value, in this case 500 μF) is unchanged in the DC-DC embodiment, the MMBC is operable in DC-DC applications with the same output current rating. The even smaller 1.3% p. u. (50 μF) capacitance value demonstrates that the MMBC also is operable with a changed resonant frequency. The comparison shows that the capacitance value chosen will influence the capacitor voltage ripple and the resonant frequency between the cell capacitor and the arm inductance but that small capacitor voltage ripple can be achieved using SCCVC with a small capacitance.

By way of comparison with the known methods for capacitance minimization by injection of circulating current alluded to above, the known methods used a frequency of injected current of between two and ten times the fundamental line frequency which is still far below the switching frequency. These techniques will allow the "shoot-through" states to occur but does not provide control of them for capacitor voltage balancing, particularly within one switching cycle. By injecting controlled circulating current at a high frequency as is achieved by the present invention by controlling the shoot-through states, the DC-DC power conversion of MMC-like converters such as MMBCs has proven to be feasible and allow the advantages of MMC architectures to be obtained.

Figure 16:
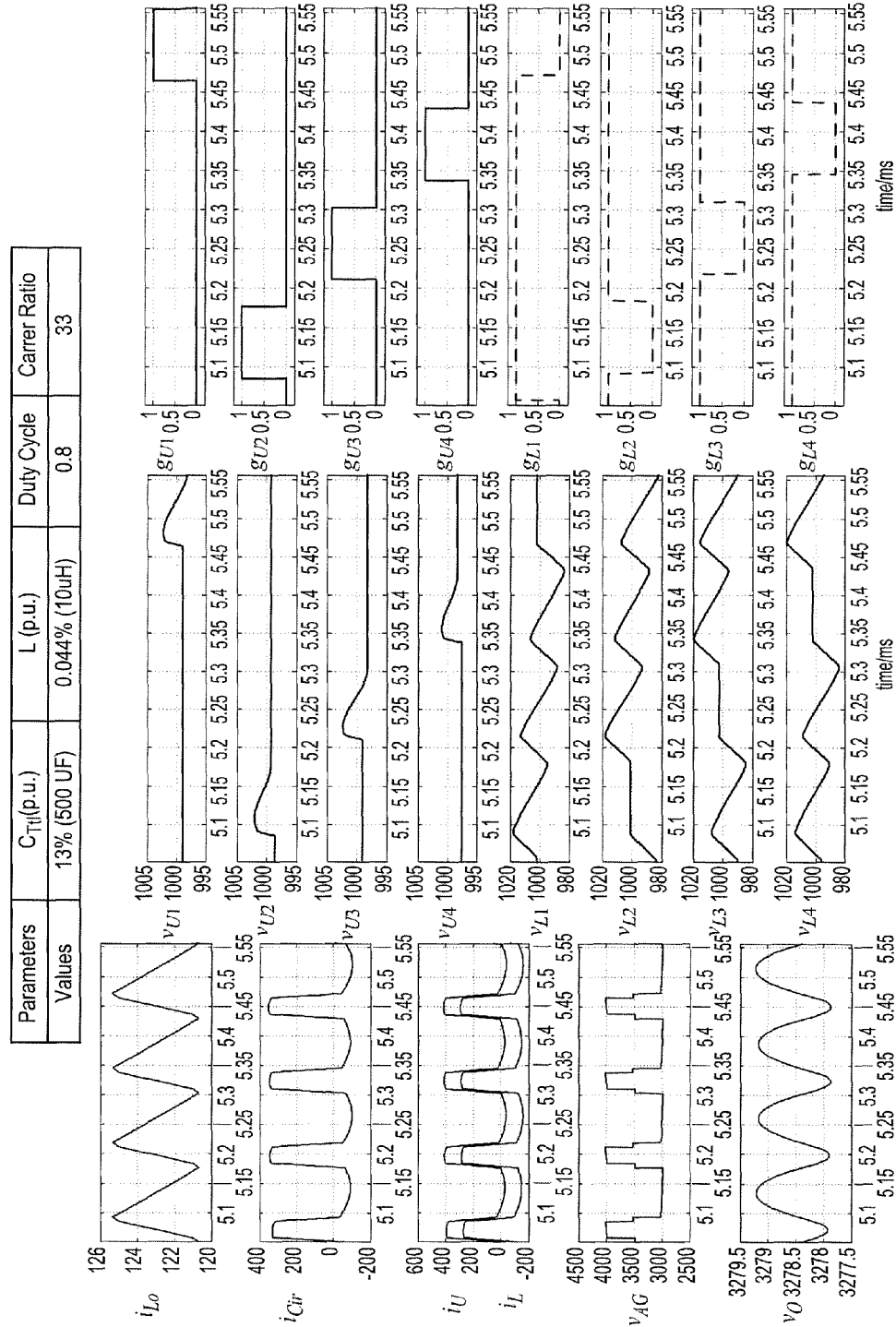
FIG. 16 illustrates simulation waveforms for a four cell per arm MMBC.

The switching waveforms for one switching cycle of a four cell per arm MMBC are shown in FIG. 16 which verifies that all the capacitor voltages achieve single switching cycle balancing. The inductor current contains DC and a component at four times the switching frequency because interleaved carriers are used for the modulation. The voltage across the inductor of the buck converter is low which is favorable for inductor design.

Figure 17:
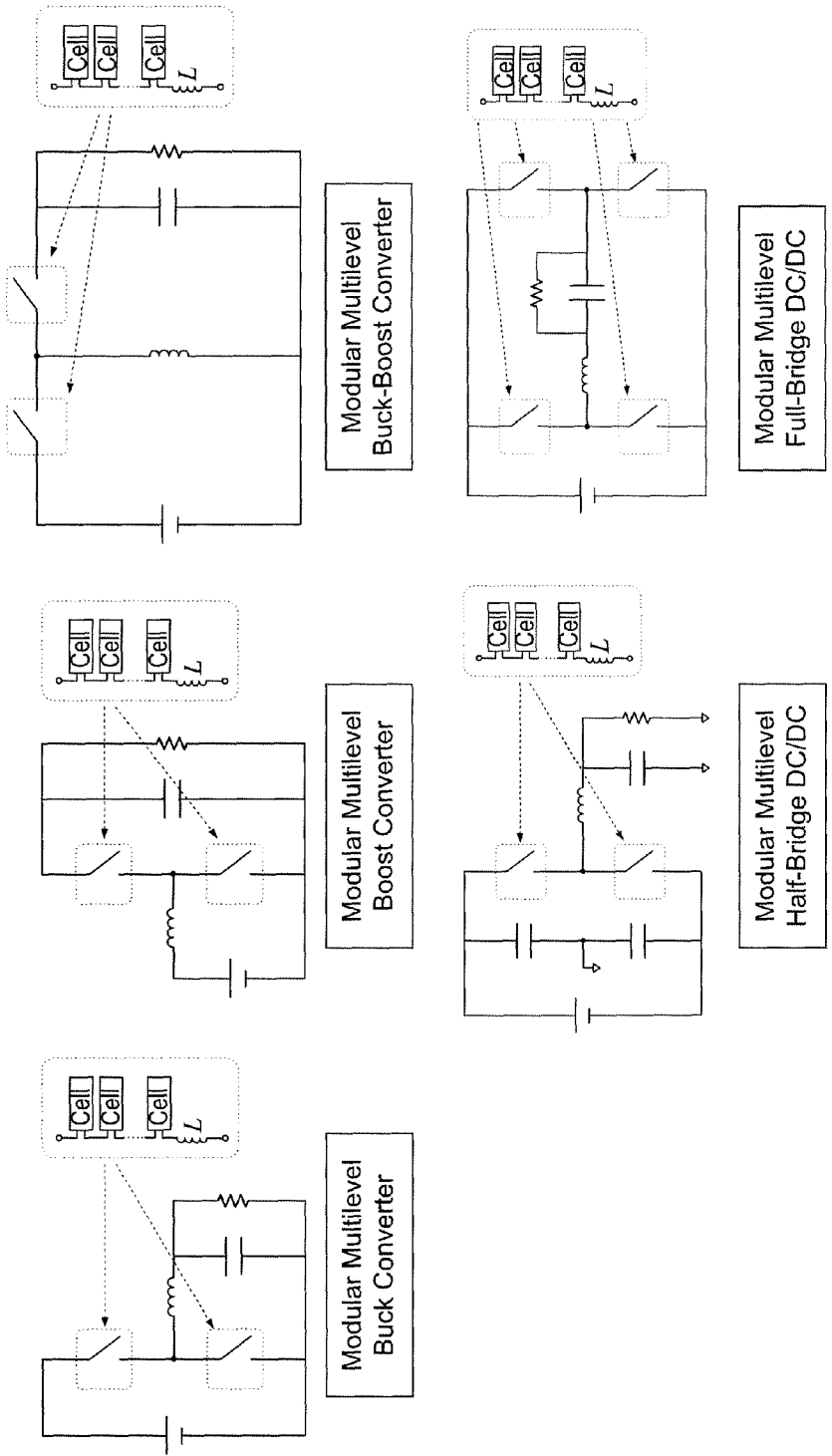
FIG. 17 illustrates schematic diagrams of other exemplary DC/DC converter topologies to which the invention is applicable.

As alluded to above, SCCVC modular multilevel converter design can be applied to any DC converter topology. Some examples of MMDC topologies are illustrated in FIG. 17. It should be noted that in each case, each switch of a generic topology can by comprised on any number of modular cells as the input voltage and output current may require such that components of reduced voltage and current specifications may be employed. SCCVC can also be applied in isolated topologies such as phase-shifted full bridge converters although an intervening AC stage would be required.

In view of the foregoing, it is seen that the use of SCCVC to balance capacitor voltages in modular multilevel converter device can achieve such balancing within a single switching cycle and allow capacitor and inductor value reduction to a very small fraction of the values required to achieve comparable capacitor voltage ripple under conventional control conditions which provides for a substantial increase in potential power density of power converters. The modular architecture of MMCs allows low voltage and low current components to be used in respective modules without direct serial or parallel connections of such components.

While the invention has been described in terms of a single preferred embodiment, those skilled in the art will recognize that the invention can be practiced with modification within the spirit and scope of the appended claims.

We claim:

1. A power converter having an upper arm and a lower arm, each said upper and lower arm comprising a switch constituted by a series connected pair of transistors and a capacitor, said power converter module being operated using at least two main switching states which cause currents that deliver power from a source to a load for controlling average value of phase current and two further switching states which cause circulating currents in said power converter that do not deliver power from said source to said load and which are interleaved alternately between said main switching states during which said capacitor is either bypassed or connected to a voltage such that said capacitor is charged to an offset voltage value and voltage across said capacitor is controlled toward a reference voltage by resonance of said capacitor with a small inductance in said power converter during a following one of said main switching states.

2. The power converter as recited in claim 1 wherein said power converter includes more than one said switch in said upper arm and said lower arm.

3. The power converter as recited in claim 2 including a plurality of branches connected in parallel, each of said plurality of branches comprising an upper arm and a lower arm.

4. The power converter as recited in claim 3 wherein said plurality of branches are operated at different phases.

5. The power converter as recited in claim 1 including a plurality of branches connected in parallel, each of said plurality of branches comprising an upper arm and a lower arm.

6. The power converter as recited in claim 5 wherein said plurality of branches are operated at different phases.

7. The power converter as recited in claim 1 wherein an error between averaged module voltage and said reference voltage is zero.

8. The power converter as recited in claim 1 wherein said average value of said phase current varies sinusoidally.

9. The power converter as recited in claim 1 wherein said average value of said phase current is controlled to produce a substantially constant voltage.

10. A method of operating a modular multi-level power converter (MMC) wherein modules of said MMC each comprise a switch and a capacitor such that said switch controls bypassing said capacitor or connecting said capacitor into said MMC and said MMC includes upper and lower arms wherein each of said upper and lower arms contains at least one said module, said method comprising
    determining approximate durations of two main switching states which cause currents that deliver power from a power source to a load in a switching cycle to provide a predetermined output voltage or waveform, and
    determining approximate durations of two additional switching states which cause circulating currents in the MMC that do not deliver power to said load in each said switching cycle to charge said capacitor of respective ones of said modules to an offset voltage value such that voltage across each said capacitor is controlled by resonance of said capacitor of a said module with a small inductance toward a reference voltage during a following one of said main switching states during a single said main switching cycle.

11. The method as recited in claim 10 wherein said reference voltage is zero.

12. The method as recited in claim 10 wherein said two approximate durations of said two additional states are predicted from capacitor voltage and inductor current conditions at the end of a previous switching cycle.

13. The method as recited in claim 12 wherein predicted durations are subjected to a trial and error process to determine a best solution among predicted durations.

14. The method as recited in claim 13 wherein said best solution is based on a minimum value of a difference between a capacitor voltage and a reference voltage.

15. The method as recited in claim 10 wherein each of said two additional switching states is implemented as a modification of a respective one of said main switching states.

16. The method as recited in claim 10 wherein said approximate durations of said two additional switching states is estimated from a state-space switching model.

17. The method as recited in claim 16 wherein estimated durations are subjected to a trial and error process to determine a best solution among predicted durations.

18. The method as recited in claim 17 wherein said best solution is based on a minimum value of a difference between a capacitor voltage and a reference voltage.

19. The method of claim 10 wherein said output voltage or waveform is a sinusoidal waveform.

20. The method of claim 10 wherein said output voltage or waveform is a substantially constant voltage.

* * * * *